April 29, 1924.
A. L. SCOTT
MOLDING MACHINE
Filed May 11, 1922   3 Sheets-Sheet 1
1,492,225
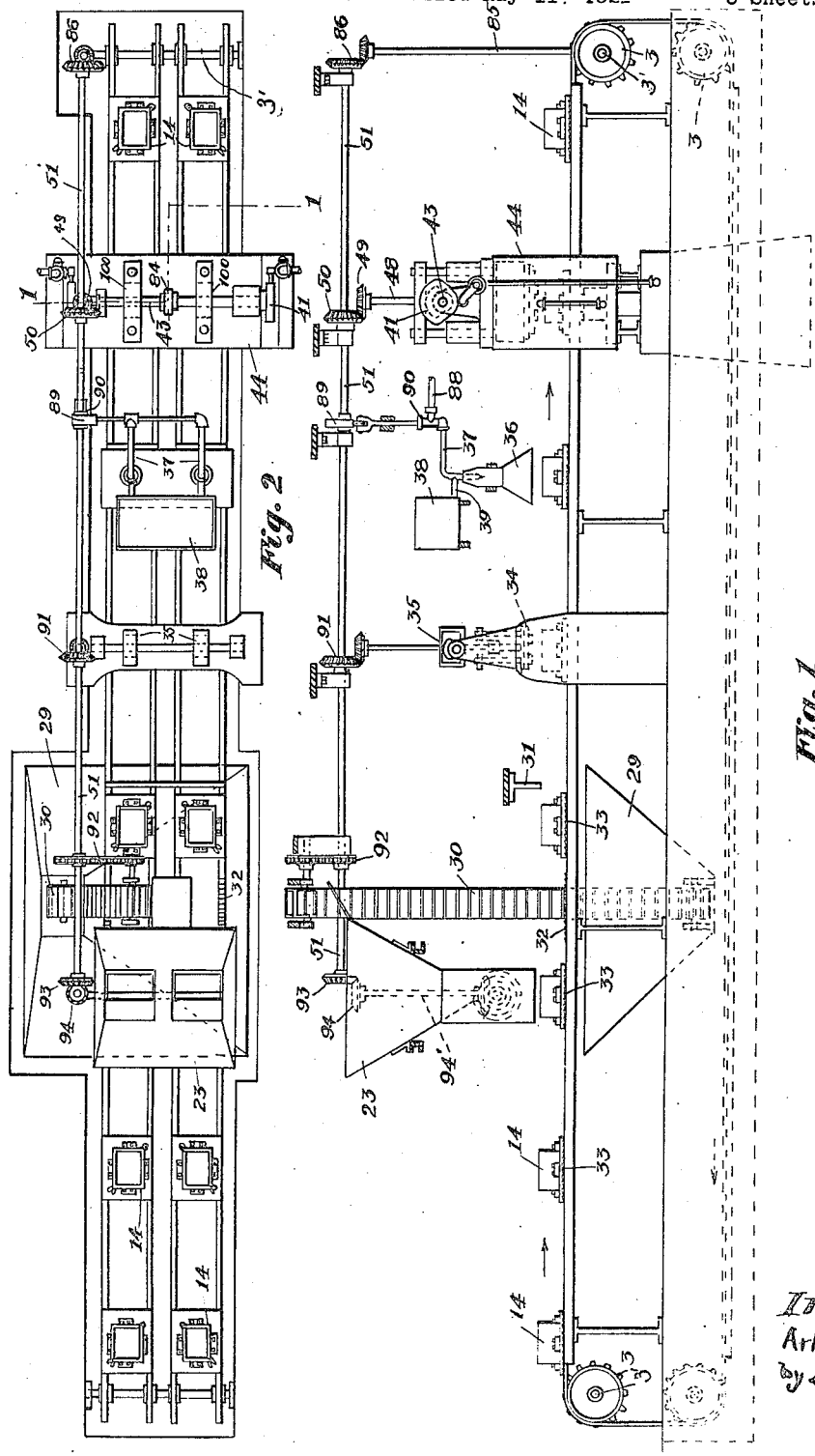
Inventor:
Arthur L. Scott
by S. W. Bates
Atty.

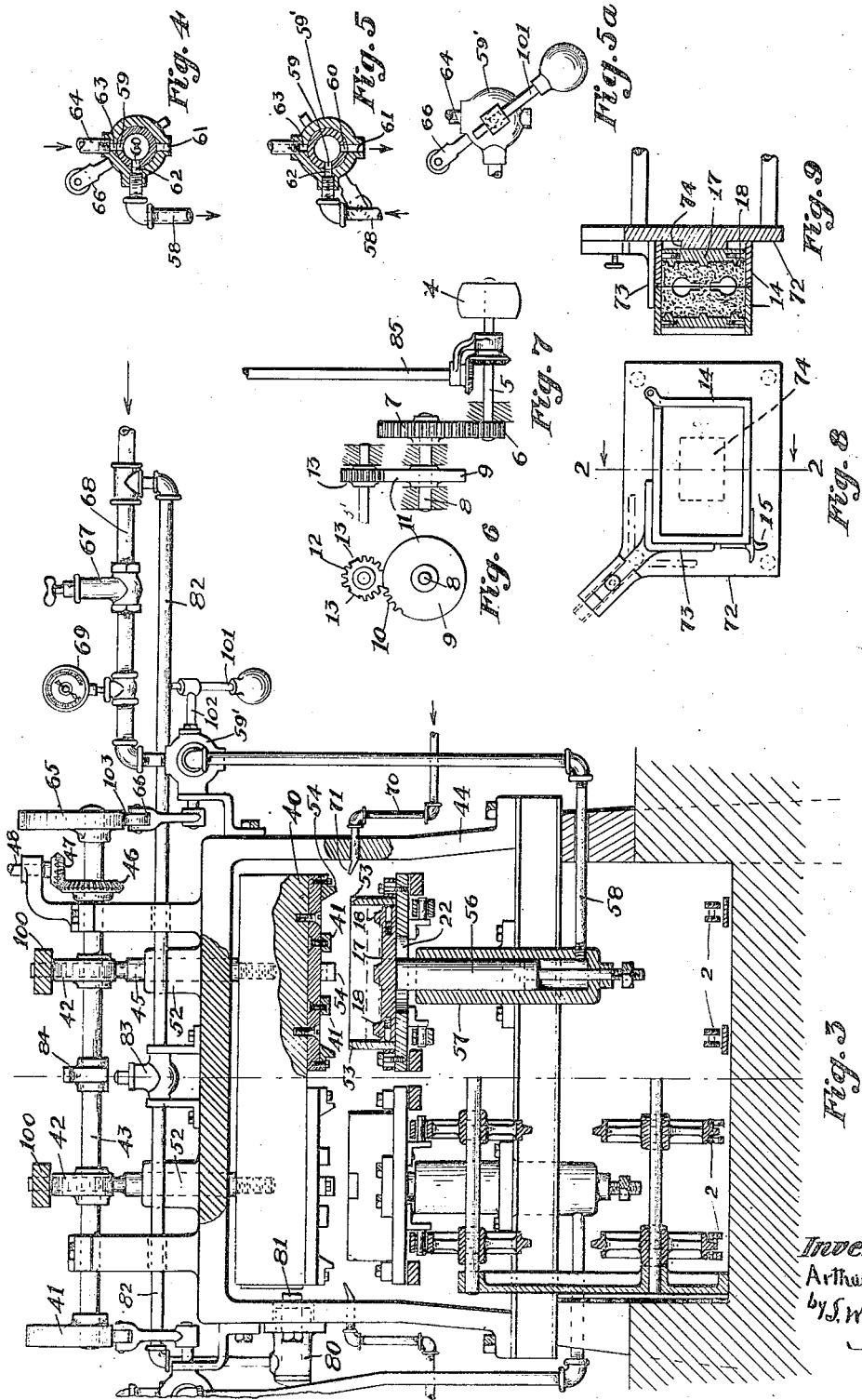

April 29, 1924.
A. L. SCOTT
1,492,225
MOLDING MACHINE
Filed May 11, 1922   3 Sheets-Sheet 3
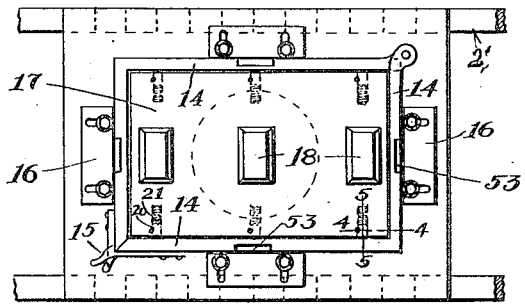
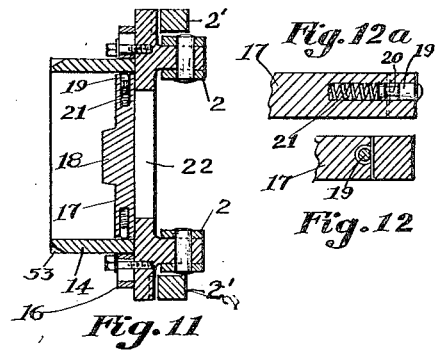
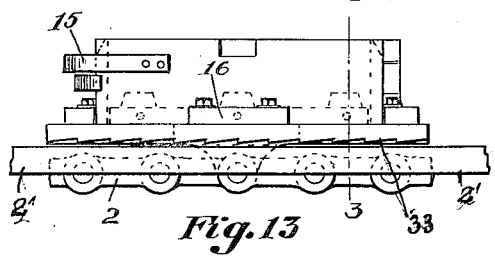
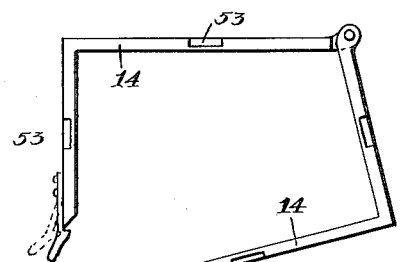
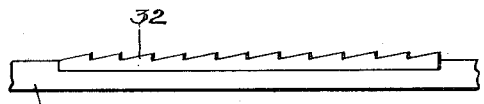
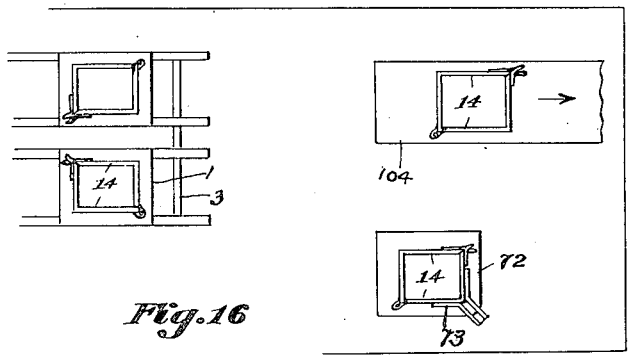
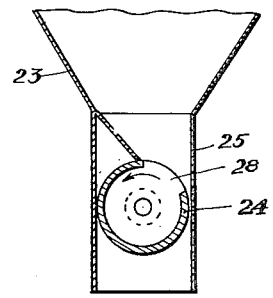
Inventor:
Arthur L. Scott
by S. W. Bates
Atty.

Patented Apr. 29, 1924.

1,492,225

UNITED STATES PATENT OFFICE.

ARTHUR LEON SCOTT, OF WORCESTER, MASSACHUSETTS.

MOLDING MACHINE.

Application filed May 11, 1922. Serial No. 560,185.

*To all whom it may concern:*

Be it known that I, ARTHUR LEON SCOTT, a citizen of the United States, residing at Worcester, in the county of Worcester and State of Massachusetts, have invented certain new and useful Improvements in Molding Machines, of which the following is a specification.

My invention relates to molding machines particularly for making iron castings of small section where the cost of molding is a large item of expense.

My invention relates to that type of molding machines employing a series of flasks which are made to follow each other continuously, the several operations incident to molding the device ready to be cast being automatically applied one after the other in succession as the flasks move along carried by the endless carrier with a motion which is preferably intermittent.

I make use in my machine of flasks made preferably in two parts and hinged together so that they can be quickly opened and closed horizontally. These flasks are placed in succession on an endless bed and are carried along from one station or position to the next, pausing in each position long enough for the molding operation to be applied.

The first operation consists of discharging into the open top of the flask a measured quantity of carefully prepared molding sand which will fill the flask to overflowing.

The flask is then carried along being subjected in its course to a shaking operation whereby the sand is thoroughly settled.

A stationary straight edge removes all the surface sand from the top of the flask, leaving the latter completely filled with well compacted molding sand.

The excess sand which remains after striking or scraping the same from the flask falls into an excess hopper and is carried by an elevator into a large supply hopper from which the flask is filled.

After passing the scraping apparatus, the flask stops at a point where dummy patterns, as I term them, are depressed into the level surface of the sand forming impressions which are the duplicate of the final cavities made by the regular patterns.

The flask now passes along to the next station where parting sand is blown into the dummy impressions.

These dummy impressions and the fact that they are coated with dust prepare the flask and the body of molding sand therein for the regular molding operation which takes place at the next station.

The regular patterns are carried by a vertically movable head located above the level of the flask which pauses beneath it.

The pattern head now descends, the patterns enter the dummy impressions in the mold and the contents of the flask is squeezed upwardly by a pneumatic plunger which is made to press upward against the bottom board, compacting the entire contents of the flask against the lower surface of the pattern head.

The pattern head is now vibrated and withdrawn. The plunger recedes, the bottom board being automatically retained in its raised position. A blast of air is then delivered on the under side of the pattern head for the purpose of cleaning it of all adhering sand.

For the purpose of compacting the sand in the spaces between the patterns and getting a lateral compression on the sand surrounding the downward projections in the several parts of the pattern, upward extending projections are formed on the bottom board for the purpose of securing a uniform compression on all portions of the mold.

The molding in the flask now being complete, the next operation is to carry the flask along to a point where it can be removed from the endless bed by an operator and placed on the assembling table.

It will be understood that two flasks are subjected simultaneously to the operations I have described, one flask being the cope and the other the nowel. Each of these flasks when the operation is complete contains the impression of one half of the completed pattern and when the two halves are accurately placed together, the mold will be ready to pour.

After each flask has been prepared as described, the cope and the nowel are both transferred by hand to an assembling table where they are placed one on top of the other to form a complete mold and the flasks are then removed, leaving an integral block of compressed molding sand which forms the complete casting mold to be finally poured.

I have illustrated my invention in the accompanying drawing in which:

Fig. 1 is a side elevation of my complete machine so far as the mechanical portion is concerned and disregarding the assembling table and adjacent parts, Fig. 2 is a plan of the same, showing the two parallel conveyers side by side.

Fig. 3 is a part section and part elevation of the molding machine proper on the line 1—1 of Fig. 2, the sectional portion of the right hand being on the upper portion of the line 1—1 and the sectional portion of the left hand side being on the lower portion of the line 1—1, Fig. 4 is a section through the air valve supplying the plunger in the molding machine proper when the pressure is on, Fig. 5 is a like section showing the position of the valve when the pressure is off and the plunger is free to fall, Fig. 5ª is a side elevation of the counter weight on the molding machine air valve, Fig. 6 is a detail elevation of the transmitting gear which imparts motion to the conveyer, Fig. 7 is an elevation of the same with a complete elevation of the actuating mechanism, Fig. 8 is a plan of the flask and the assembling table, Fig. 9 is a cross section on the line 2—2 of Fig. 8, Fig. 10 is a plan of the flask in position on one of the base plates of the endless conveyer, Fig. 11 is a cross section of the same on the line 3—3 of Fig. 13, Fig. 12 is a detail section on the line 4—4 of Fig. 10 and, Fig. 12ª is a detail section on the line 5—5 of Fig. 10, the last two sections showing the edge of the bottom board only with the friction pin therein, Fig. 13 is a side elevation of the flask mounted on the base plate, Fig. 14 is a side elevation of a portion of the track between the flask filling portion and scraping portion of the apparatus and showing means of shaking the contents of the flask, Fig. 15 is a plan of the flask partially opened, Fig. 16 is a plan of the end of the conveyers and the adjacent assembling tables and, Fig. 17 is a vertical section through the sand hopper.

It will be understood in the following description that similar letters of reference indicate similar or identical parts in the apparatus and that the devices as here shown in the drawings are simply used as illustrative of one form in which my invention may be carried out as many modifications may be designed which will come within the terms of the appended claims.

Referring to the drawing, I provide an endless carrier made up of base plates 1 connected together by a sprocket chain 2 running over rails 2′ and sprocket wheels 3. Power is applied to the endless conveyer by a suitable pulley 4 running on a shaft 5, (Fig. 7).

On the end of the shaft 5 is a suitable pinion 6 running in connection with a gear 7 mounted on a shaft 8.

Intermittent motion is applied to the shaft 3′ of the sprocket wheel 3 which operates the endless carrier by a gear 9 having a blank section 11 and a short gear section 10. The gear section 10 is designed to engage the teeth of a pinion 12 having a series of blank sections 13 three in number which correspond with the blank section 11 of the blank gear 9.

The operating mechanism shown in Figs. 6 and 7 is connected with an extension of shaft 3′ not shown.

The arrangement is such that the endless conveyer will be carried forward a standard distance between stations while the teeth 10 are in engagement with the teeth 12 at which time the blank spaces on the gear 12 will come adjacent to the blank space 11 on the gear 9 and the motion on the endless conveyer will be checked until the blank space on the gear 9 turns entirely over to bring the teeth 10 again in engagement with the teeth of the gear 12.

It will be understood that while I have shown one means of applying intermittent motion to the sprocket wheels 3, any other suitable mechanism may be used for this purpose which will carry the flasks from station to station and allow a sufficient pause for the longest operation of the series which will be the molding operation.

The flask as here shown is made in two halves 14 hinged at one corner and having at the opposite corner two spring catches 15 which when the flask is closed hold the two parts firmly in place and prevent it from spreading.

The flask is preferably composed of iron or steel castings generally rectangular in shape.

The flask in its closed position is placed accurately on the base section 1 between adjustable guides 16 placed on the top of the plate, (Fig. 11).

In the bottom of each flask is a bottom board 17 of usual character and to the upper surface of the bottom board are secured projections or blocks 18 which will vary in size and shape according to the character of the pattern.

These blocks are inserted for the purpose of securing more uniform compression of sand around the patterns proper as will be afterwards more fully described.

Means are provided for holding the bottom board in frictional connection with the sides of the flask so that it will remain in any desired vertical position as when pressed upward in the squeezing operation.

For this purpose, I have shown a spring plug applied to several points in the bottom board, (Figs. 12 and 12ª).

As shown, a plug 19 with rounded ends is inserted in a hole formed in the edge of the bottom board, one on each edge of the board. A neck 20 of smaller diameter than the plug is formed in the rear of the plug and a vertical nail or wire passing through the board adjacent to the neck 20 holds the plug in place while it allows the longitudinal movement of the same. A spring 21 in the rear of the plug keeps it pressed uniformly outward so that the bottom board will remain in any position in which it is placed in the flask.

The base plate 1 is provided with a central opening 22 through which the plunger of the molding machine may act upward against the bottom board in the squeezing operation to be afterwards described.

The first operation to which the flask is submitted after having been placed in position on one of the base plates is to be filled with prepared molding sand. For this purpose, I provide a supply hopper 23 which is kept constantly filled with specially prepared molding sand of fine quality.

A definite amount of sand is dumped into the flask as it pauses beneath the hopper and this amount is more than sufficient to fill the flask, some overflow being desired in order to completely fill the flask.

The sand filling device consists of a hollow drum 24 rotatably supported in the nozzle 25 at the lower end of the hopper 23.

The drum 24 has an open filling and discharging space 28 on one side so that as the drum intermittently rotates, it will first be filled when the opening is upward and discharged when the opening 28 turns down to allow the sand to escape. The excess sand overflowing from the flask falls into a hopper 29 below the track and is carried upward by means of an elevator 30 and dropped into the upper portion of a hopper 23 where it is used over again.

The flask being completely filled with molding sand is next passed along to the scraping device 31 which is so located as to draw across the upper surface of the flask so that the latter will stand completely filled with a smooth and even upper surface.

In passing from the filling hopper, however, to the scraper means are provided for agitating the flask to settle the sand so that when scraped it will settle no further and be completely filled during the molding operation.

For the purpose of agitating the flask, I have shown herein a series of teeth 32 formed as a portion of the track 2' with a corresponding series of teeth 33 formed on the under side of the base plate.

The teeth formed on the track and the teeth formed on the base plate are inclined in opposite directions so that as the base plate slides over the track, there will be a constant jarring vertical vibration which will settle the sand into all the recesses of the flask and form a smooth even surface for the application of the patterns.

The hopper 29 is sufficiently wide so that it will take the overflow from the hopper 23 and also from the scraper.

The next operation in the treatment of the flask is to impress into the prepared surface of the molding sand what I term the dummy patterns, which comprise a set of patterns on the lower surface of a vertical movable head 34.

This head 34 is forced downwardly when the flask comes into the proper position by the rotation of a cam 35 or by other suitable instrumentalities.

For the next operation, the flask is moved to the next position where the dummy impressions are coated with parting dust.

As here shown, a flaring cover 36 hangs over the flask when the latter is in position and a jet of compressed air is forced from the supply pipe 88 through a pipe 37 drawing a charge of parting sand from the hopper 38, the blast of air passing down by the outlet 39 of the hopper. This jet of air precipitates a cloud of parting dust on the upper surface of the mold and prepares the same for the reception of the regular pattern. A cam 89 on the main shaft 51 acts through suitable connections on the valve 90 which turns on the compressed air just as it is needed to apply the parting dust.

The next operation is the molding of the regular patterns which are attached to the under side of the pattern head 40. 41 indicates the regular patterns which, of course, vary in shape and size according to the article to be cast.

The pattern head as here shown, has first a downward motion for forcing the patterns into the sand. It then has a dwell at its lower position during which the squeezing action takes place and it is finally agitated and withdrawn from the sand to its upper position. These motions are all effected by the cams 42 secured to the shaft 43 journalled on the top of the molding machine frame 44.

The cams 42 act on the under surface of the yoke 100 secured to the top of the pattern head and extend over the cam. The rotation of the cam acts to lift the head and the weight of the head and its connecting parts acts to depress it.

The shaft 43 is rotated by means of a mitre gear 46 secured thereto and engaging with a mitre gear 47 on the lower end of an upright shaft 48 (see Fig. 3) on the upper end of which is a mitre gear 49 (see Fig. 1) engaging with a mitre gear 50 on the main shaft 51 which serves to actuate the series of mechanical devices.

The pattern head is forced downward by its weight as the rotation of the cam 42 allows it to fall.

When at its lowest position the patterns are indented into the sand entering the dummy impressions and the lower surface of the head rests on the upper edge of the flask.

Means are provided for exactly centering the patterns and the pattern heads with respect to the flask so that if the latter or the base plate on which it rests is slightly out of position, the flask and pattern head when they finally come together will exactly register.

For this purpose, I form tapering recesses 53 in the four sides of the flask at their upper edges and into these tapering recesses corresponding tapering blocks 54 secured to the pattern head fit as the head descends. (Fig. 3).

The fitting of the block 54 into the tapering recesses 53 on the four sides of the flasks accurately adjusts the relative positions of the two parts so that the patterns fit the dummy impressions with great accuracy. If the dummy impressions are slightly out of position or if they are made a trifle smaller than the true patterns, the accurate fitting of the flask and the head together as above indicated will form a true impression.

The pattern head and the flask being now in their locked position, the squeezing operation at once takes place by forcing the bottom board 17 upward to compress the molding sand against the lower surface of the pattern head.

The bottom board is forced upward by a pneumatic plunger acting in a cylinder 57, the plunger acting through the opening 22 in the base plate 1.

Compressed air is transmitted to the cylinder 57 through the air pipe 58 connected with the valve 59'.

The valve is so arranged and timed that when the time for the squeezing operation is due, the valve will be open and pressure applied to the plunger and when the squeezing operation is complete, the valve will turn to a point where the air confined in the cylinder 57 will be allowed to escape and the plunger will fall by reason of its own weight. The squeezing operation by compacting the sand around the patterns will correct any slight inaccuracy of alignment.

In Figs. 4 and 5, are shown sections through the air valve which is a three-way valve having ports 59 and 60 on the inner rotating portion of the valve with exterior ports 61 and 62 and 63.

The adjustment is such that when the pressure is to be applied to the plunger 56 the valve will be in position, as shown in Fig. 4 with the interior ports 59 and 60 in line with the ports 63 and 62. This allows the air from the air supply pipe 64 to pass through the pipe 58 to the cylinder and force the piston 56 upward.

When the squeezing operation is completed, the valve is turned so that the internal port 59 is in line with the external port 61.

In this position of the valve, the pipe 58 is connected with the discharge opening 61 and the pressure being thus released in the cylinder 57, the plunger falls away from the bottom board allowing the latter to remain in its raised position by its friction on the side of the flask as explained.

The bottom board which will be lifted slightly by the squeezing operation forces the projections 18 into the spaces between the patterns causing a lateral compression of the sand against the sides of the patterns and forming a solidly molded body which will remain in shape and will not be distorted by ordinary handling.

The various movements of the valve 59 described are effected by the cam 65 on the end of the shaft 43 acting against the arm 66 by which the valve is rotated.

The air pressure on the plunger 56 in the squeezing operation must be varied more or less according to the character of the patterns molded and for this purpose, I connect the main air supply valve 68 which carries a heavier pressure than ordinarily required on my machine with a reducing valve 67 with a pressure gauge 69 designed to indicate the reduced pressure adaptable to the squeezing operation. The counter weight 101 on the end of the valve stem 102 will keep the arm or the anti-friction roll 100 thereon always against the cam.

As the pattern head is lifted and when at top position, means are provided for blowing air under pressure against its under surface for the purpose of cleaning from the patterns any sand which may have adhered to them.

For this purpose, I connect an air pipe 70 with a nozzle 71 directed against the under side of the pattern head and turned on for an instant by mechanism not here shown, when the pattern head is lifted.

As the patterns are drawn from the sand, they are vibrated for the purpose of leaving a clean impression. For this purpose, as here shown, I secured a pneumatic hammer 80 to the casing of the machine in a position where the hammer proper 81 would rap the edge of the pattern head. Compressed air is supplied to the hammer through an air pipe 32 connected with a supply pipe 68 and controlled by a valve 83. A cam 84 on the shaft 43 is arranged to open the valve 83 at just the moment the pattern head is being lifted. Any other suitable vibrating mechanism may be used.

As before stated, power is supplied to the machine through a pulley 4 (see Fig. 4) and thence through a pair of mitre gears to a vertical shaft 85 and through a pair of mitre gears 86 (see Fig. 1) to the main shaft 51 which extends above the entire line of mechanical devices already described. The main shaft 51 connects as already shown, with the device for applying parting dust. It also connects through gears 91 with the means for applying the dummy patterns and through sprocket chains and wheels 92 with the elevator 30 by which the surplus sand is lifted as shown. A mitre gear 93 on the end of the main shaft 51 connects with a mitre gear 94 on an upright shaft 94' at the lower end of which is mechanism not specifically shown for rotating the drum 34 and discharging the sand to fill the flask.

Each of the two flasks, the cope and nowel, having been molded, are next fed along to a new station which may be as shown in Fig. 16, the end of the endless conveyer from which the cope and the nowel are removed by hand and placed on an assembling table as 72.

On this assembling table is a relatively high corner bracket 73 into which one corner of the flask is pressed thus centering it accurately.

The cope is first placed in position and the nowel turned over and placed on top of the cope, both flasks being pressed into the corner bracket 73 so that the two molds will exactly register.

When the flask is placed on the assembling table 72 the bottom of the bottom board will have been raised in the squeezing operation to some little distance above the lower edge of the flask, leaving the bottom board without support except the friction due to the friction plugs 19.

To furnish support for the bottom board, I provide the top of the table with an adjustable projection 74 which is designed to be the exact thickness represented by the upward squeezing motion of the plunger 56.

Thus, the bottom board will have a solid support on the table.

The flasks are now removed by releasing the spring catches 15 and the resulting integral blocks may now be carried on the bottom board to the pouring floor where they are poured to complete the casting.

Before the flasks are removed, the pouring hole may be made quickly by hand and previous to putting the cope and novel together, the operator can inspect the impressions in the mold and make any repairs necessary as in the ordinary process of molding.

Also, any cores required may be inserted as the flasks are being fed along after being molded or when they are placed on the assembling table to be assembled.

It will be seen that my molding machine carries out a continuous operation from the time the flasks are placed on the endless carrier until the molding operation is complete.

The hand work required to complete the work and finish the mold so that it may be poured is very slight as compared with the preparation of the flask and my machine will be capable of turning out complete molds, especially for the smaller type of work in large quantities and at small cost.

I claim:—

1. In a molding machine, the combination of an endless conveyer, a series of flasks carried thereby, a sand hopper, a shut-off for the same for discharging an excess of sand into each of said flasks as they pass under said hopper, a receptacle for the overflowed sand and means for returning said excess sand to said hopper.

2. In a molding machine, the combination of an endless conveyer, a series of flasks carried thereby, a sand hopper, a shut-off for the same for discharging an excess of sand into each of said flasks as they pass under said hopper, means for vibrating said flask to settle the sand therein and a scraper for removing the excess of sand from each of said flasks.

3. In a molding machine, the combination of an endless conveyer, a series of flasks carried thereon, means for charging each flask with sand, a dummy pattern and means for impressing said pattern into the surface of the sand.

4. In a molding machine, the combination of an endless conveyer, a series of flasks carried thereon, means for charging each flask with sand, a dummy pattern, means for impressing said pattern into the surface of the sand and means for applying parting dust to the surfaces of the dummy impressions.

5. In a molding machine, the combination of an endless conveyer, a series of flasks carried thereon, means for charging each flask with sand, a dummy pattern, means for impressing said pattern into the surface of the sand and means for blowing parting dust into the dummy impressions.

6. In a molding machine, the combination of an endless conveyer, a series of flasks carried thereon, means for charging each flask with sand, a dummy pattern, means for impressing said pattern into the surface of the sand, means for applying parting dust to the surface of the dummy impressions and means for inserting the true pattern into said dummy impressions.

7. In a molding machine, the combination of an endless conveyer, a series of flasks carried thereon, means for charging each flask with sand, a dummy pattern, means for impressing said pattern into the surface of the sand, means for applying parting dust to the surface of the dummy impressions, a pattern head for carrying the true patterns, means for lowering said head and causing the true patterns to register with said dummy impressions and means for squeezing the sand upward adjacent to said head and pattern.

8. In a molding machine, the combination of a vertically movable pattern head carrying patterns on its under surface, a charged flask, means for lowering said head to form the pattern impression in the sand of said flask, an upward acting plunger for squeezing the sand upward against said head and means for lifting said head and lowering said plunger to complete the molding operation.

9. In a molding machine, the combination of a vertically movable pattern head carrying patterns on its under surface, a charged flask including a bottom board, means for lowering said head to form the pattern impression in the sand, an upward acting plunger for forcing said bottom board upward to compress the sand against the head and means for lifting the pattern head and lowering the plunger to complete the molding operation.

10. In a molding machine, the combination of an endless conveyer, a series of flasks carried thereon, means for filling said flasks with molding sand, a vertically movable pattern head and a centering device for bringing said pattern head and flask into alignment as they are brought together.

11. In a molding machine, the combination of an endless conveyer, a series of perforated base plates carried thereby, a series of flasks on said base plate, a bottom board for said flasks, means for loading said flasks with molding sand, a pattern head for impressing the patterns in the sand and a plunger acting upwardly through said base plate for forcing said bottom board against the pattern head to compress the said molding sand.

12. In a molding machine, the combination of a pair of endless conveyers, a series of flasks on each conveyer placed opposite each other, means for filling each flask with compressed molding sand and means for indenting in the sand of each flask opposing portions of the pattern positioned so as to form the complete matrix when the flasks are joined face to face.

ARTHUR LEON SCOTT.